(12) United States Patent
Burklow

(10) Patent No.: US 8,992,106 B1
(45) Date of Patent: Mar. 31, 2015

(54) OPTICS CLEANING APPARATUS AND METHOD

(71) Applicant: Melvin A. Burklow, Pace, FL (US)

(72) Inventor: Melvin A. Burklow, Pace, FL (US)

( * ) Notice: Subject to any disclaimer, the term of this patent is extended or adjusted under 35 U.S.C. 154(b) by 0 days.

(21) Appl. No.: 13/694,369

(22) Filed: Nov. 26, 2012

(51) Int. Cl.
B05C 1/00 (2006.01)
G02C 13/00 (2006.01)

(52) U.S. Cl.
CPC .................................. G02C 13/00 (2013.01)
USPC ............................................................ 401/16

(58) Field of Classification Search
USPC ................... 401/16–18, 23, 24, 29, 198, 199
See application file for complete search history.

(56) References Cited

U.S. PATENT DOCUMENTS

| 3,606,556 | A | * | 9/1971 | Green et al. | 401/231 |
| 4,842,132 | A | * | 6/1989 | Wells | 206/229 |
| 5,342,136 | A | * | 8/1994 | Fukami | 401/135 |
| 7,303,347 | B1 | * | 12/2007 | Duncan | 401/123 |
| 2003/0152410 | A1 | * | 8/2003 | Huang | 401/19 |
| 2012/0315073 | A1 | * | 12/2012 | Spirko et al. | 401/17 |

* cited by examiner

Primary Examiner — David Walczak
(74) Attorney, Agent, or Firm — J. Nevin Shaffer, Jr.

(57) ABSTRACT

An optics cleaning apparatus includes a buffing cloth section where the buffing cloth section includes a buffing cloth housing and a buffing cloth removal clip. A scrub pad section where the scrub pad section includes a scrub pad and a dust bush housing. And a cleaning section, where the cleaning section includes a dust brush, a reservoir section and a fluid applicator, where the fluid applicator is connected with the reservoir section and where the fluid applicator includes an air channel connected with the reservoir section and where the reservoir section includes a fluid cartridge.

19 Claims, 3 Drawing Sheets

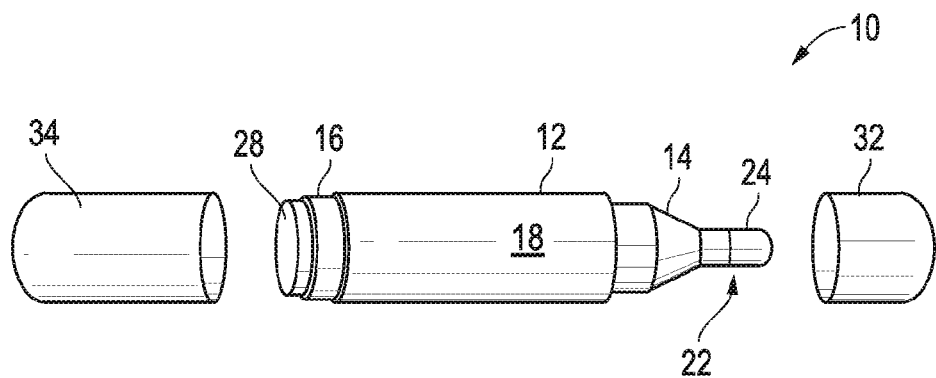
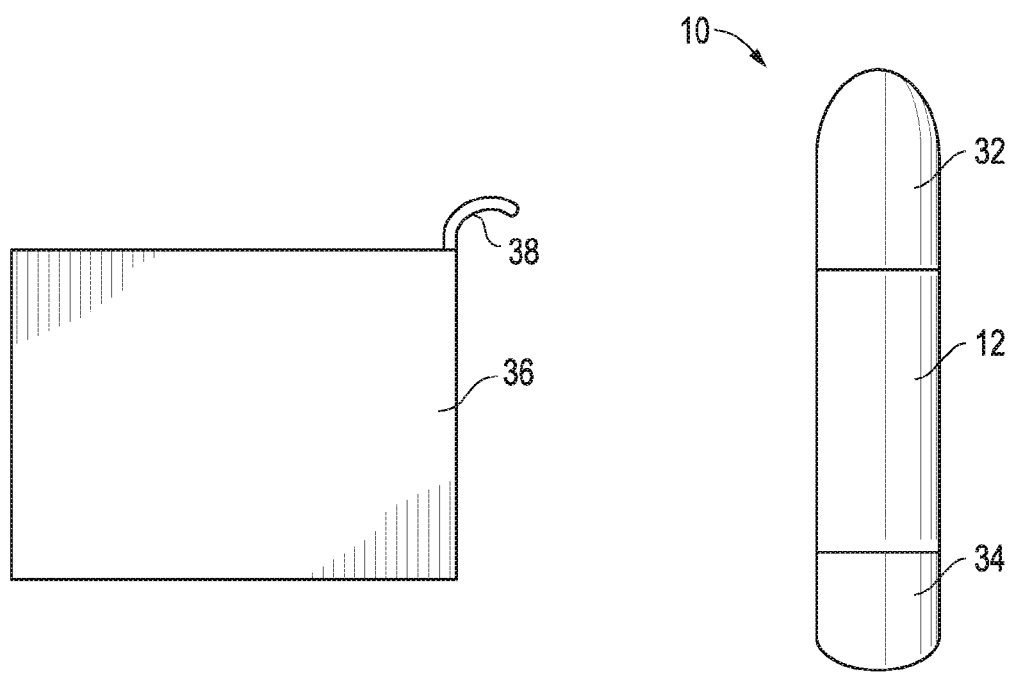
FIG. 1
FIG. 2
FIG. 3

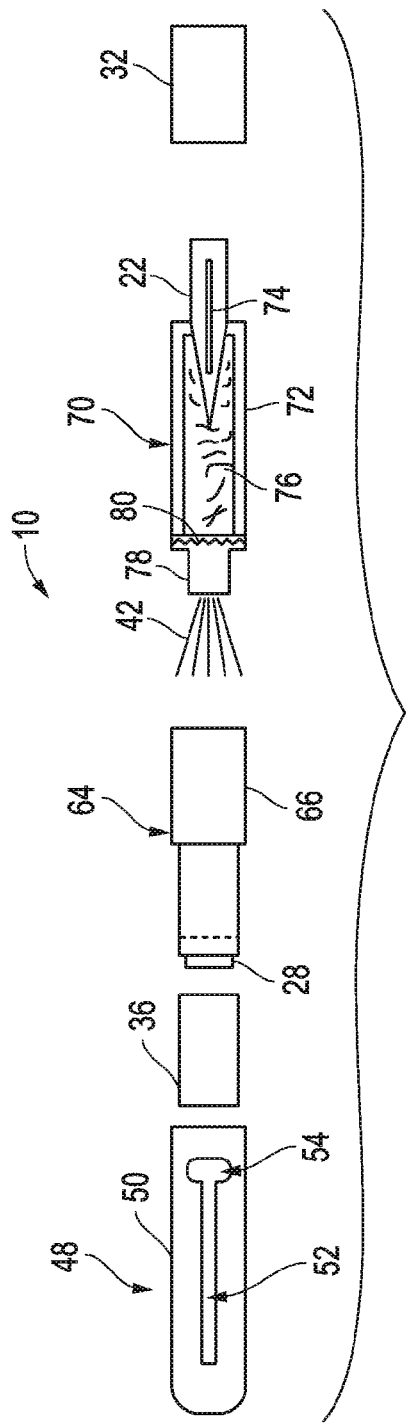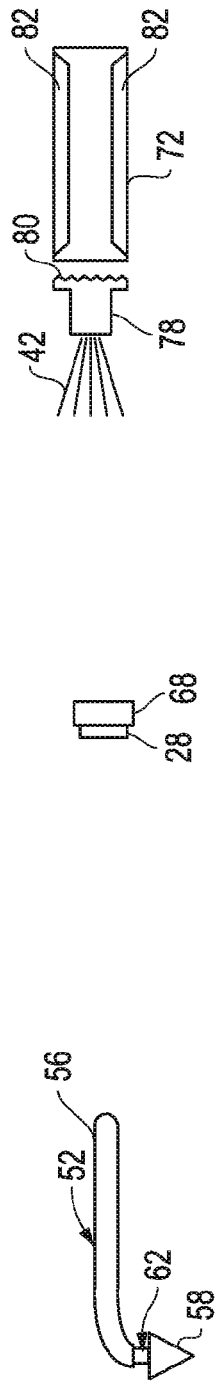

OPTICS CLEANING APPARATUS AND METHOD

CROSS REFERENCE TO RELATED APPLICATION

This application is a Continuation in Part of pending U.S. patent application Ser. No. 13/068,023 filed Apr. 29, 2011 entitled "Optics Cleaning Apparatus and Method". The Applicant hereby claims the benefit of the non-provisional application under 35 U.S.C. §120. The entire content of the non-provisional application is incorporated herein by this reference.

FIELD OF THE INVENTION

This invention relates to an optics cleaning apparatus and method. In particular, in accordance with one embodiment, the invention relates, to an optics cleaning apparatus including a buffing cloth section where the buffing cloth section includes a buffing cloth housing and a buffing cloth removal clip. A scrub pad section is provided where the scrub pad section includes a scrub pad and a dust brush housing. Further, a cleaning section is provided where the cleaning section includes a dust brush, a reservoir section and a fluid applicator, where the fluid applicator is connected with the reservoir section and where the fluid applicator includes an air channel connected with the reservoir section and where the reservoir section includes a fluid cartridge.

BACKGROUND OF THE INVENTION

A problem arises with regard to devices that include lenses. Devices such as safety glasses, eyeglasses, cameras, binoculars, rifle scopes, microscopes, telescopes, video lenses, computer and analog monitors, personal digital assistants (PDAs) and the like have lenses that must be kept clean in order to function at full capacity. Dirt, moisture, smears and or fogging, smudges, oil, and other debris present in the working environment of the device are a constant source of contamination and create an ongoing need for constant cleaning of the lens.

Prior art solutions range form using anything handy, shirt sleeves, tissue paper and such, to dedicated cleaning solutions and cloths. The problem with the prior art solutions are that the handy items may seriously compromise the lens, scratching or damaging it beyond usefulness. As the expense of the device increases the need for a proper, non-damaging solution to the problem increases such that users find themselves having to have a shelf load of cleaning supplies available when needed. Supplies required for a proper cleaning include a wide variety of devices and materials such as large particle dirt removers such as brushes and wipes. Also required are cleaning solutions, cleaning solution applicators and scrubbers, and cleaning and drying cloths that do not damage the lens. Such an assortment of materials is cumbersome and difficult to transport easily "in the field", in particular, and as a result, lens care often reverts to what is handy. What is handy, though, risks seriously degrading the lens.

Further, one particularly vexing problem is access to and dispensing of the materials in these prior art kits. It is often difficult to access the various elements. In particular, fluid dispensing is difficult to regulate since closed containers are needed to contain the fluid but enabling the fluid to freely flow from those containers is a problem.

Thus, it is clear that a need exists for a fully self contained, optics maintenance apparatus and method for cleaning optics that enables a professional cleaning of a lens "in the field", that is safe and easy to use and that is not cumbersome to carry or hard to maintain. It is a further object to provide a device where the various separate elements are easily dispensed and accessed.

It, therefore, is an object of this invention to provide an apparatus and method for cleaning optics that is not cumbersome to carry, that is easy to access and maintain, that is safe and easy to use and that enables a professional lens cleaning wherever and whenever needed.

SUMMARY OF THE INVENTION

Accordingly, the optics cleaning apparatus of the present invention, according to one embodiment includes a buffing cloth section where the buffing cloth section includes a buffing cloth housing and a buffing cloth removal clip. A scrub pad section is provided where the scrub pad section includes a scrub pad and a dust brush housing. Further, a cleaning section is provided where the cleaning section includes a dust brush, a reservoir section and a fluid applicator, where the fluid applicator is connected with the reservoir section and where the fluid applicator includes an air channel connected with the reservoir section and where the reservoir section includes a fluid cartridge.

As used herein, terms are given their common meaning. "Section" is used to describe discrete parts of the whole invention. "Holder" is used to describe something that contains and retains something else. "Reservoir" describes a space in the holder within which material may be added to and withdrawn from. "Fluid applicator" is a device for applying a fluid from the applicator to another location. In this regard, the fluid applicator may be any such device as, for example only and not by way of limitation, a spray nozzle or a fluid soaked permeable material. "Scrub pad" is used to describe a device conformed to be applied to another surface and to rub and scrub it without damage to the surface.

In another aspect of the invention, the invention further includes a hole in the buffing cloth section accommodated to moveably retain the buffing cloth removal clip and where the buffing cloth removal clip includes and exterior handle connected with an interior grip. In a further aspect, the exterior handle is conformed to detach from and re-attach with the hole.

In one aspect, the reservoir section includes spacing splines such that the fluid cartridge is centered within the reservoir section. In another aspect, the fluid applicator includes an exterior portion and an interior portion and where the interior portion extends into the fluid cartridge.

In a further aspect, the dust brush is connected with a removable cap sealing the reservoir section and the removable cap includes spacers such that the spacers create air spaces and prevent contact of the removable cap with the fluid cartridge at some locations.

In one aspect, the scrub pad is connected to a removable ring such that the removable ring is detachable from the scrub pad section.

According to another embodiment of the invention, an optics cleaning apparatus includes a holder with a first end, a second end and outer surface where the outer surface encloses an internal reservoir and where the internal reservoir includes an absorbent cartridge. A fluid applicator is connected with the first end and with the internal reservoir and the absorbent cartridge. A scrub pad is connected with the second end, a dust brush is connected with the holder and a buffing cloth is contained within the holder.

In one aspect of this invention, a fluid applicator cover and a scrub pad cover are provided in which both covers connect with the holder. In another aspect, the reservoir further includes an optics cleaner. In a further aspect, the dust brush is connected with the second end and the scrub pad connects with the dust brush. In one aspect, the buffing cloth is contained within either the cover for the first end or the second end. In one aspect, the buffing cloth includes a buffing cloth removal device for removing the buffing cloth from the cover. In another aspect, the second end is removable and the internal reservoir is refillable.

According to another embodiment, an optics cleaning method consists of the steps of:

a. providing an optics cleaner with a buffing cloth section where the buffing cloth section includes a buffing cloth housing and a buffing cloth removal clip; a scrub pad section where the scrub pad section includes a scrub pad and a dust brush housing; and a cleaning section where the cleaning section includes a dust brush, a reservoir section and a fluid applicator, where the fluid applicator is connected with the reservoir section and where the fluid applicator includes an air channel connected with the reservoir section and where the reservoir section includes a fluid cartridge with optics cleaner;

b. applying the optics cleaner to an optic device with the fluid applicator; and c. rubbing the optics cleaner on the optic device with the scrub pad.

In another aspect of the invention, the holder includes a buffing cloth. In another aspect, the method includes the step of buffing the optics device with the buffing cloth after rubbing the cleaner on the optics device. In one aspect, the method includes the step, before applying optics cleaner to the optic device, of dusting the optics device with the dust brush.

DESCRIPTION OF THE DRAWINGS

Other objects, features and advantages of the present invention will become more fully apparent from the following detailed description of the preferred embodiment, the appended claims and the accompanying drawings in which:

FIG. 1 is an exploded view of the optics cleaning apparatus according to one embodiment;

FIG. 2 is a top view of the buffing cloth according to one embodiment;

FIG. 3 is a top view of the invention of FIG. 1 with cap covers in place on the first end and the second end of the holder;

FIG. 7 is an exploded view of the optics cleaning apparatus according to another embodiment;

FIG. 8 is a side view of the detachable exterior handle;

FIG. 9 is a side view of the scrub pad attached to the removable ring; and

FIG. 10 is a side partial exploded view showing the dust brush and removable cap detached from the reservoir section and showing the spacing splines in the reservoir section.

DETAILED DESCRIPTION OF THE INVENTION

Figure 4:
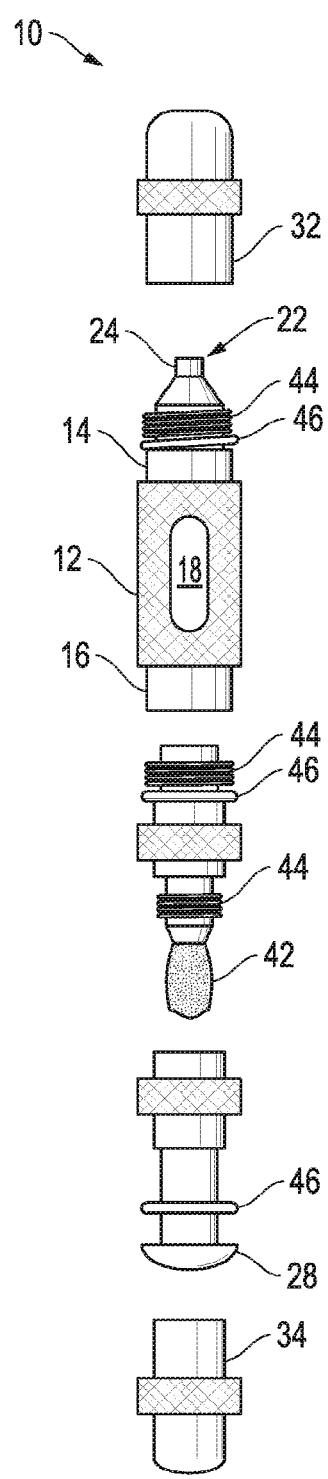
FIG. 4 is an exploded view of another embodiment of the invention including a dust brush assembly.

The preferred embodiment of the present invention is illustrated by way of example in FIGS. 1-10. With specific reference to FIG. 1, an optics cleaning apparatus 10, according to one embodiment, includes a holder 12 with a first end 14 and a second end 16. Holder 12 may be any desired shape but is preferably tube like with a round outer surface 18 for example only and not by way of limitation. Holder 12 includes a hollow space created by outer surface 18. The hollow space on the inside of holder 12 serves as a reservoir 20 as more clearly shown in FIG. 5.

Holder 12 may be made of any desired material such as plastic or metal. Holder 12 may be in any dimension such as one-half inch to one inch in diameter and three to six inches in length, for example only. The point to be noted is that it is very compact and thus it is easy to store and transport. It will fit, for example, in a shirt pocket.

Fluid applicator 22 is connected with first end 14 of holder 12 and with reservoir 20. Thus, fluid applicator 22 is of sufficient length such that there is an exterior portion 24 and an interior portion 26 of fluid applicator 22 as more clearly shown in FIG. 5.

Fluid applicator 22 preferably may be made of any porous material now known or hereafter developed that absorbs and releases fluid. MAKA MARK™ by Chuck Moore of Elkton, Tenn. and SHARPIE™ Marker Pens are suitable and representative of the type and function of the applicator required by the invention. Fluid applicator 22, it should be understood, acts as a wick to transport fluid from the reservoir 20 to the exterior portion 24 of fluid applicator 22 as will be discussed more fully hereafter. It should be understood, however, that fluid applicator 22 may be a spray nozzle, as known in the art and not described more fully hereafter, connected with the reservoir 20 and still serve the required purpose of the invention.

Scrub pad 28 is connected with second end 16 of holder 12. Scrub pad 28 is made of any suitable material such as a micro fiber material such that use of the scrub pad in evenly spreading a fluid 30 onto a lens (not shown) and rubbing and scrubbing the lens does not scratch or damage the lens or any lens coatings that may be present. Any such material now known or hereafter developed is suitable.

Preferably, a fluid applicator cover 32 and a scrub pad cover 34 are provided as well. The covers ensure that dirt and debris are prevented from coming in contact with fluid applicator 22 and scrub pad 28 when they are not in use. Further, the covers connect with holder 12 to form a single sealed unit as shown in FIG. 3. This prevents the escape of fluid 30 when not in use, for example, and keeps the scrub pad 28 clean. Covers 32 and 34 may be press fit connected or screw thread connected with holder 12 or connected in any other effective manner.

Referring now to FIG. 2, buffing cloth 36 is illustrated. Buffing cloth 36 is preferably made of a micro fiber material that is absorbent and soft such that it will not damage lenses or lens coatings. Preferably buffing cloth 36 is of a size to fit within one of the covers 32 or 34. Applicant has found that extending scrub pad cover 34 a little provides space to include buffing cloth 36. Location in fluid applicator cover 32 is possible as well but it was found that the buffing cloth 36 would absorb fluid 30 from fluid applicator 22 and is not ideal.

In one aspect, Applicant has determined that adding a buffing cloth removal device 38 is very useful. Buffing cloth removal device 38 preferably is in the form of an extension or "rat tail" from the buffing cloth 36. In use, the buffing cloth 36 is stuffed into the end cap 34 with the removal device 38 pushed in last. When time comes to remove the buffing cloth 36 the user simply pulls on removal device 38 and the buffing cloth 36 is easily retrieved for use.

Referring now to FIG. 4 an exploded version of another embodiment of the optics cleaning apparatus 10 is illustrated in which like numbers are used to identify like parts as described above with regard to FIGS. 1 and 3.

Figure 5:
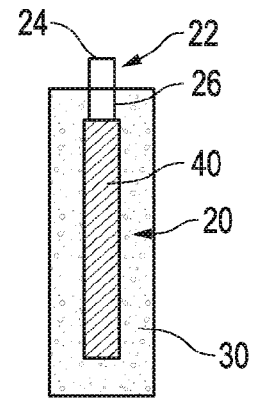
FIG. 5 is a partial section view of the invention of FIG. 3 illustrating the connection of the fluid applicator with an absorbent cartridge within the reservoir.

Accordingly, optics cleaning apparatus 10 includes a holder 12, with a first end 14 and a second end 16 and an outer surface 18 enclosing a reservoir 20 (see FIG. 5). A fluid applicator 22 is provided that includes an exterior portion 24 and an interior portion 26. The interior portion 26 extends into reservoir 20, all as described above.

Further, however, in this embodiment, as shown in FIG. 5, reservoir 20 includes an absorbent cartridge 40. Fluid 30, such as lens cleaning and anti-fogging fluid as is known in the art, is introduced into reservoir 20 where it is absorbed by absorbent cartridge 40 and then slowly released or transferred to the interior portion 26 of fluid applicator 22. In use, the exterior portion 24 of fluid applicator 22 transfers fluid 30 to a lens as described above. A suitable cleaning and defogging fluid 30 is PARKER'S PERFECT™ by ParBur Labs of Hollister, Mo., for example only and not by way of limitation.

Absorbent cartridge 40 facilitates the uniform transfer of fluid 30 and continuously absorbs fluid 30 from reservoir 20. Importantly, according to this embodiment, second end 16 is removable such that fluid 30 may be added to reservoir 20 as needed. In the embodiment shown in FIG. 1, this means that scrub pad 28 is unscrewed or disconnected from second end 16 which exposes fluid reservoir 20 and allows fluid 30 to be added. After filling, the scrub pad 28 is reconnected with second end 16 and the optics cleaning device 10 is ready for continued use.

According to the embodiment shown in FIG. 4, a dust brush 42 is connected with second end 16 and the scrub pad 28 is connected to the holder 12 by connection with the dust brush 42 as shown. Dust brush 42 is a non-abrasive anti-static brush useful when needed to remove large dust and debris prior to application of cleaning fluid 30. A suitable brush is made by Gordon Brush Mfg. Co. of Commerce, Calif. that is made of goat hair, for example only and not by way of limitation.

Still referring to FIG. 4, this embodiment is a more rugged embodiment in that fluid applicator cover 32 and scrub pad cover 34 are connected with holder 12 by threaded engagements 44 as illustrated. Further, gaskets 46 are provided to ensure a closed and sealed environment when attached.

Likewise, dust brush 42 is connected with second end 16 with threaded engagements 44 in combination with gasket 46 to ensure that fluid 30 is prevented from leaking out of reservoir 20. Similarly, scrub pad 28, in this embodiment, is connected with holder 12 by connection with dust brush 42 by threaded engagements 44 and including sealing gasket 46 as illustrated.

Referring to FIG. 5, a partial section view of the invention of FIG. 3 is presented that illustrates the connection of the fluid applicator 22 with an absorbent cartridge 40 within the reservoir 20. Here, fluid 30 in the reservoir 20 is absorbed by absorbent cartridge 40 and, passes to interior portion 26 and then to exterior portion 24 of fluid applicator 22 as described above. It should be understood, of course, that absorbent cartridge 40 and fluid applicator 22 may be a single piece of material that is both absorbent and strong enough to serve as an applicator.

Figure 6:
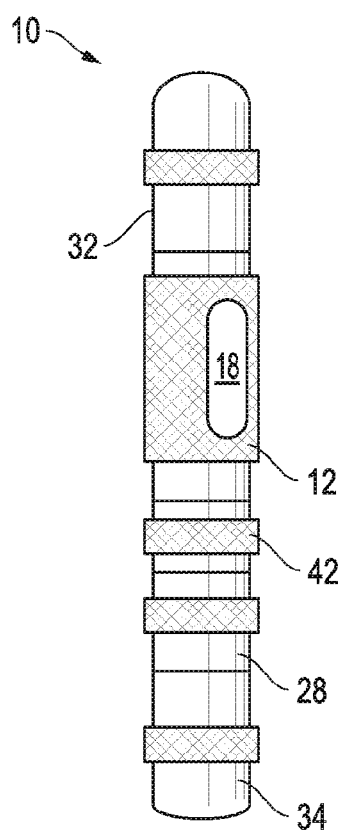
FIG. 6 is a top view of the invention of FIG. 4 with cap covers in place on the first end and the second end of the holder.

Referring to FIG. 6, the optics cleaning apparatus 10 is shown assembled with covers 32 and 34 in place. As assembled, optics cleaning apparatus 10 is a fully self contained optics cleaning kit that is easy to use and easy to carry. In this configuration, including the dust brush 42 attachment, the Applicant has determined that a functional device includes the dimensions of three-quarters of an inch to one and one-half inches in diameter and five to ten inches in length. Again, any suitable dimensions for the task that are functional are acceptable. Further, it should be understood that some or all of the listed elements of the invention are removable and replaceable. On the other hand, a simple version of the invention as shown, for example, in FIG. 1 may be designed to be used and thrown away.

In operation, a user carries optics cleaning apparatus 10 with him, in his shirt pocket, for example. When a lens on a device being used needs cleaning, the optics cleaning apparatus 10 is pulled out. First, in the version shown in FIG. 1, fluid applicator cover 32 is removed and fluid applicator 22 is used to apply fluid 30 to the lens. Fluid applicator cover 32 is replaced and scrub pad cover 34 is removed and scrub pad 28 is used to evenly distribute fluid 30 on the lens and to clean the lens with the fluid 30. Then, if present, buffing cloth 36 is removed with buffing cloth removal device 38 from scrub pad cover 34 and used to buff and dry the lens. Then the buffing cloth is stuffed into scrub pad cover 34 with the buffing cloth removal device 38 last and the cover is replaced. Optics cleaning apparatus 10 is now ready for reuse.

In the case where a user carries optics cleaning apparatus 10 in the version shown in FIG. 4, before applying the fluid 30, scrub pad cover 34 along with scrub pad 28 are unscrewed from holder 12. Dust brush 42 is then used to brush dust and debris from the lens. Then fluid 30 is applied. Scrub pad 28 is reconnected and used as described above. Then scrub pad cover 34 is reattached and the optics cleaning apparatus 10 is ready for use again.

Should fluid 30 run low, this version enables the user to add more fluid by removing dust brush 42 from the second end 16 of holder 12. This exposes reservoir 20 and, in this case absorbent cartridge 40. Fluid 30 is added, the apparatus reassembled and it is ready to go.

Applicant has determined that there is a problem with prior art devices in that the various elements are not easily accessible or dispensed. Referring now to FIG. 7 an exploded view of another embodiment of the invention is illustrated. Here the optics cleaning apparatus 10 includes a buffing cloth section 48. Buffing cloth section 48 includes a buffing cloth housing 50 and a buffing cloth removal clip 52 (see FIG. 8). Preferably, buffing cloth housing 50 includes a hole 54. Hole 54 is conformed to accommodate buffing cloth removal clip 52 when it includes and exterior handle 56 and an interior grip 58, as shown in FIG. 8. Hole 54 includes space big enough for interior grip 58 to pass. Interior grip 58 is connected with exterior handle 56 by a small channel guide 62. After interior grip 58 is inserted into hole 54 small channel guide 62 allow both exterior handle 56 and interior grip 58 to slide in hole 54. In use, buffing cloth removal clip 52 is connected with buffing cloth housing 50 as just described and moved as far up into hole 54 as it will go. Thereafter, buffing cloth 36 is simply stuffed into buffing housing 50. When it is desired to remove the buffing cloth 36, all that is needed is to slide buffing cloth removal clip 52 down hole 54. Interior grip 58 connects with buffing cloth 36 and forces it out of buffing cloth housing 50. Advantageously, when assembled, buffing cloth removal clip 52 is used as a common pen clip to clip the optics cleaning apparatus 10 in place in a pocket, for example only.

Still referring to FIG. 7, scrub pad section 64 includes scrub pad 28 and dust brush housing 66. As shown in FIG. 9, preferably scrub pad 28 is connected to a removable ring 68 such that the removable ring 68 is detachable from the scrub pad section 64. Applicant has determined that another weakness in prior art devices is that they are not "renewable". If the scrub pad wears out, as they all eventually do, the entire device must be discarded. According to this embodiment of the present invention, new scrub pads 28 are easily provided by removing the ring 68 and replacing it with a new ring 68 with a new scrub pad 28. This greatly extends the working life of the invention over prior art devices.

FIG. 7 also illustrates the cleaning section 70 of this embodiment in which the cleaning section 70 includes the dust brush 42, a reservoir section 72 and fluid applicator 22. Fluid applicator 22 is connected with reservoir section 72. Importantly, fluid applicator 22 in this embodiment includes an air channel 74 and the reservoir section 72 includes a fluid cartridge 76 fluid cartridge 76 is similar to absorbent cartridge 40 as described hereafter. Air channel 74 runs from the exterior portion 24 of fluid applicator 22 to the interior portion 26. Applicant has determined that a major failure of and problem with prior art device is in the steady supply of fluid to the applicator 22. Air channel 74 allows a small amount of air to enter reservoir section 72 and thereby prevents vapor lock. Prior art devices, Applicant has found, will work reasonably well in dispensing fluid initially. However, as the fluid is used, vapor lock develops and ultimately even though fluid is still available none will be dispensed. At that point, as with the worn out scrub pad problem described above, even though some elements of the prior art devices may still function it is of no use and is simply discarded.

FIG. 7 shows that the fluid applicator 22 with the air channel 74 extends well into fluid cartridge 76 thus ensuring a steady flow of fluid to the exterior portion 24 of fluid applicator 22. Another feature of this embodiment also enhances fluid flow. As shown, dust brush 42 is connected with a removable cap 78. Removable cap 78 seals reservoir section 72 includes spacers 80. Spacers 80, illustrated as teeth shaped projections, for example only, create air spaces and prevent contact of removable cap 78 with fluid cartridge 76 at some locations. Thus, in combination, Applicant has found that air channel 74 and spaces 80 create a flow of air just sufficient to ensure that vapor lock does not occur and that all fluid 30 is dispensed that is available up to the time it is essentially all gone.

This embodiment also includes a final element that ensures steady and certain fluid delivery and flow. FIG. 10 shows reservoir section 72 (without fluid cartridge 76 for clarity) with spacing splines 82. Spacing splines 82 are provided such that fluid cartridge 76 is centered within the reservoir section 72 and again ensure air flow into reservoir section 72. In combination then, air channel 74, spacer 80 and spacing splines 82 create a controlled environment for the steady and complete dispensing of fluid 30 from fluid cartridge 76. Fluid applicator cover 32 prevents the unwanted dispensing of fluid 30 when not in use.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An optic cleaning apparatus comprising:
   a. a buffing cloth section wherein said buffing cloth section includes a buffing cloth housing and a buffing cloth removal clip;
   b. a scrub pad section wherein said scrub pad section includes a scrub pad and a dust brush housing; and
   c. a cleaning section wherein said cleaning section includes a dust brush, a reservoir section and a fluid applicator, wherein said fluid applicator is connected with said reservoir section and wherein said fluid applicator includes an air channel connected with said reservoir section and wherein said reservoir section includes a fluid cartridge and wherein said dust brush is connected with as removable cap sealing said reservoir section and wherein said removable cap includes spacers such that said spacers create air spaces and prevent contact of said removable cap with said fluid cartridge at some locations.

2. The apparatus of claim 1 further including a hole in said buffing cloth section accommodated to moveably retain said buffing cloth removal clip and wherein said buffing cloth removal clip includes an exterior handle connected with an interior grip.

3. The apparatus of claim 2 wherein said exterior handle is conformed to detach from and re-attach with said hole.

4. The apparatus of claim 1 wherein said reservoir section induces spacing splines such that said fluid cartridge is centered within said reservoir section.

5. The apparatus of claim 4 wherein said fluid applicator includes an exterior portion and an interior portion and wherein said interior portion extends into said fluid cartridge.

6. The apparatus of claim 1 wherein said fluid applicator includes an exterior portion and an interior portion and wherein said interior portion extends into said fluid cartridge.

7. The apparatus of claim 1 wherein said scrub pad is connected to a removable ring such that said removable ring detachable from said scrub pad section.

8. The apparatus of claim 1 wherein said reservoir further includes an optics cleaner.

9. An optics cleaning apparatus comprising:
   a. a buffing cloth section wherein said buffing cloth section includes a buffing cloth housing and a buffing cloth removal clip;
   b. a scrub pad section wherein said scrub pad section includes a scrub pad and a dust brush housing; and
   c. a cleaning section wherein said cleaning section includes a dust brush, a reservoir section and a fluid applicator, wherein said fluid applicator is connected with said reservoir section and wherein said fluid applicator includes an air channel connected with said reservoir section and wherein said reservoir section includes a fluid cartridge and wherein said reservoir section includes spacing splines such that said fluid cartridge is centered within said reservoir section and wherein said dust brush is connected with a removable cap sealing said reservoir section and wherein said removable cap includes space such that said spacers create air spaces and prevent contact of said removable cap with said fluid cartridge at some locations.

10. The apparatus of claim 9 further including a hole in said buffing cloth section accommodated to moveably retain said buffing cloth removal clip and wherein said buffing cloth removal clip includes an exterior handle connected with an interior grip.

11. The apparatus of claim 10 wherein said exterior handle is conformed to detach from and re-attach with said hole.

12. The apparatus of claim 9 wherein said fluid applicator includes an exterior portion and an interior portion and wherein said interior portion extends into said fluid cartridge.

13. The apparatus of claim 9 wherein said scrub pad is connected to a removable ring such that said removable ring is detachable from said scrub pad section.

14. The apparatus of claim 9 wherein said reservoir further includes an optics cleaner.

15. An optics cleaning apparatus comprising:
a. a buffing cloth section wherein said buffing cloth section includes a buffing cloth housing and a buffing cloth removal clip;
b. a scrub pad section wherein said scrub pad section includes a scrub pad and a dust brush housing; and
c. a cleaning section wherein said cleaning section includes a dust brush, a reservoir section and a fluid applicator, wherein said fluid applicator is connected with said reservoir section and wherein said fluid applicator includes an air channel connected with said reservoir section and wherein said reservoir section includes a fluid cartridge wherein said reservoir section includes spacing splines such that said fluid cartridge is centered within said reservoir section and wherein said fluid applicator includes an exterior portion and an interior portion and wherein said interior portion extends into said fluid cartridge and wherein said dust brush is connected with a removable cap sealing said reservoir section and wherein said removable cap includes spacers such that said spacers create air spaces and prevent contact of said removable cap with said fluid cartridge at some locations.

16. The apparatus of claim 15 further including a hole in said buffing cloth section accommodated to moveably retain said buffing cloth removal clip and wherein said buffing cloth removal clip includes and exterior handle connected with an interior grip.

17. The apparatus of claim 16 wherein said exterior handle is conformed to detach from and re-attach with said hole.

18. The apparatus of claim 15 wherein said scrub pad is connected to a removable ring such that said removable ring is detachable from said scrub pad section.

19. The apparatus of claim 15 wherein said reservoir further includes an optics cleaner.

\* \* \* \* \*